United States Patent Office 2,777,938
Patented Jan. 15, 1957

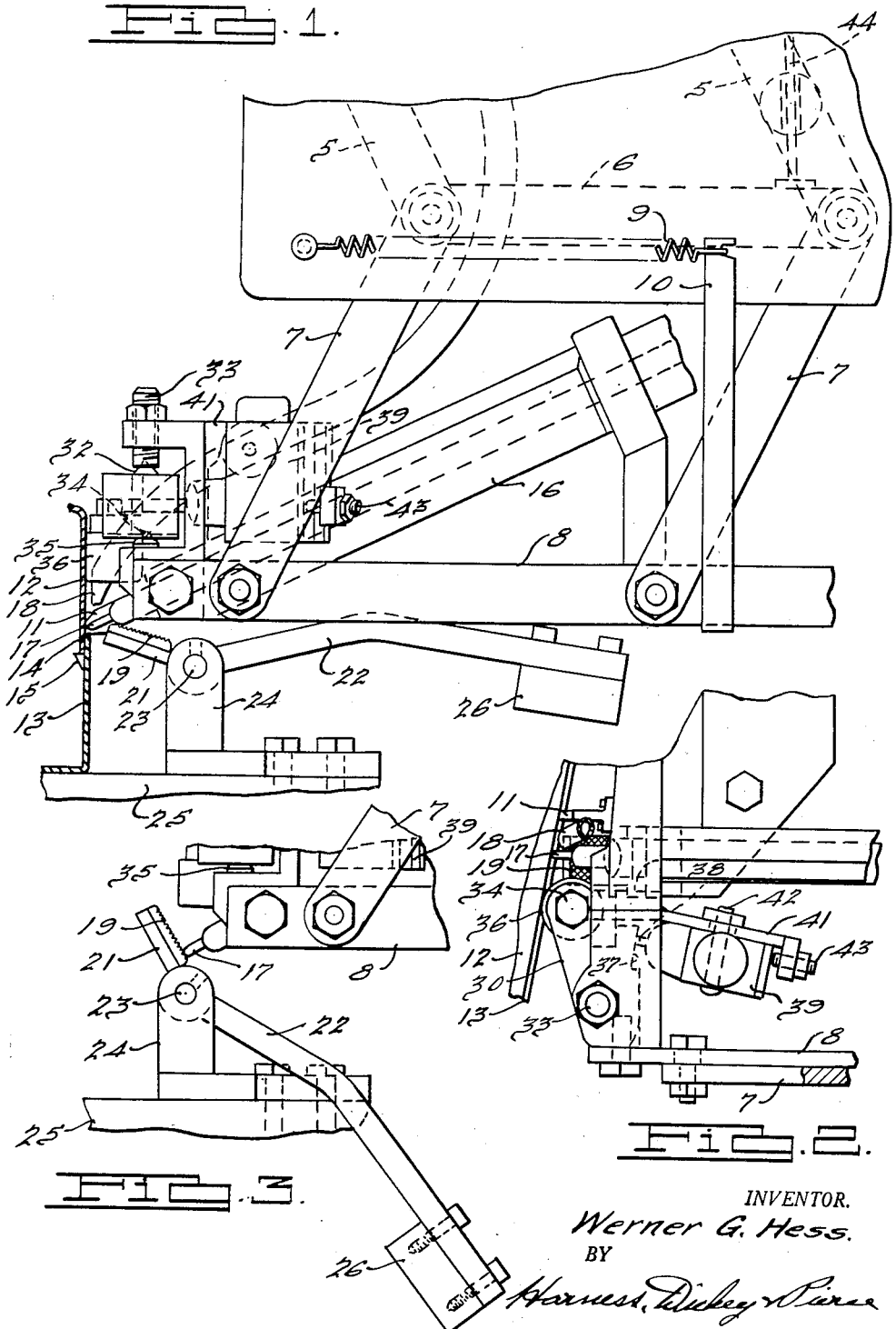

2,777,938
WELDING MACHINE

Werner G. Hess, Dearborn, Mich., assignor, by mesne assignments, to Dana Corporation, Toledo, Ohio, a corporation of Virginia Application May 18, 1953, Serial No. 355,784

4 Claims. (Cl. 219—130)

This invention relates to welding machines, and particularly to a welding machine having a head supporting a guide finger and a welding rod in a manner to follow an undulated joint to be welded, the path of which varies both in the vertical and horizontal planes.

In the copending applications of Werner G. Hess, Serial No. 204,864, filed January 8, 1951, for Overlapped Joint Welding Device, and Serial No. 229,634, filed June 2, 1951, now U. S. Patent 2,724,036 granted November 15, 1955, for Overlapped Joint Welding Device, which were assigned to the assignee of the present invention, welding machine are illustrated, described and claimed which are capable of following an undulated joint and producing the welding thereon through the use of a finger which guides the welding rod along the joint as the path of the joint varies inwardly, outwardly, upwardly and downwardly.

The present invention pertains to additional elements of the machine which operate in conjunction with the movable head and which embody means for removing the crusted flux from the end of the welding rod which would otherwise insulate the end, and a control structure which retracts the welding device from the joint when the guide fingers drops off of the ledge defining the joint. A section of a file is pivoted on the base of the machine adjacent to the point where the weld initially occurs, disposed in the path of movement of the welding rod as it is swung into welded position. The end of the welding rod strikes the file surface and in passing thereover the crusted flux on the end is broken from the rod so that metal-to-metal contact will occur between the rod and the metal to be welded when the rod is moved into engagement therewith. The finger adjacent to the rod guides the rod along the weld, and should the finger drop off of the ledge at the joint, a device is provided on the head which operates a switch to control a circuit which causes the head to swing away from the work and thereby interrupt the operation before damage can be done to the structure being welded.

Accordingly, the main objects of the invention are: to provide a device which supports a guide finger and a welding rod, with a control mechanism which retracts the finger and rod from engagement with the workpiece when the finger drops off of the ledge at the joint being welded; to provide a file surface in the path of movement of the welding rod which removes the crusted flux from the end of the rod to assure metal-to-metal contact between the rod and workpiece when the rod is moved into engagement therewith; to provide control mechanisms for a welding device which assures the metal-to-metal engagement between the welding rod and workpiece when initial engagement occurs therebetween and to interrupt the welding operation when the guide finger for the device drops off of the ledge forming the joint to be welded, and in general, to provide a welding device with control mechanism which is simple in construction, which positively controls the initial striking of the arc and which prevents the arc from damaging the workpiece when the guide finger for the device moves out of contact with the joint to be welded.

Other objects and features of novelty of the invention will be specifically pointed out or will become apparent when referring, for a better understanding of the invention, to the following description, taken in conjunction with the accompanying drawing, wherein:

Figure 1 is a broken view in side elevation of a welding device having control means thereon which embody features of the present invention;

Fig. 2 is a broken plan view of the structure illustrated in Fig. 1; and

Fig. 3 is a view of the structure illustrated in Fig. 1 during the movement of the welding head into welding position.

The welding device of the present invention is similar to that illustrated and described in the above mentioned copending applications. The device has an upper pair of pivoted arms 5 interconnected by a cross bar 6, the arms supporting a second pair of pivoted arms 7 interconnected by a cross bar 8. A spring 9, connected to the support for the arms 5 and to the bar 8 by a bracket 10, urges the bar 8 toward the bar 6. During the initial downward swinging movement of the arms, the guide finger 11 on the bar 8 will strike the surface of the workpiece 12 and then move downwardly to engage the edge of the flange 13 which forms an overlapped joint 14 to be welded. It is to be understood that the welding operation is performed on a pair of chassis frame rails of channel section which are disposed in telescoped relation. The pair of flanges 12 of one chassis rail is telescoped within the pair of flanges 13 of the other rail, the degree of telescoping being limited by ledges 15 which are struck-in portions provided along the flanges 13, as explained more specifically in the above mentioned copending applications.

The cross bar 8 also carries mechanism 16 for advancing a welding rod 17 toward the joint 14 and feeding the rod during the welding operation. Flux is delivered to the joint through a nozzle 18 so that the welding operation will be performed with a submerged arc, as is the common practice. During the welding operation, the flux becomes molten, and at the end of the welding cycle some of the molten flux will adhere to the end of the welding rod 17 and will cause faulty welds when the rod is moved into engagement with the metal at the joint 14 to be welded. The lack of the metal-to-metal contact between the rod and joint will prevent the weld from occurring until after the machine has advanced some distance, sufficient to cause the crusted flux to be broken from the rod end.

In practicing the present invention, a section of a file 19 is mounted on a head 21 in extension of an arm 22 which is secured by a pivot 23 to a bracket 24 which is mounted on the base 25 of the machine. The opposite end of the arm 22 from that supporting the head 21 has a weight 26 thereon which resists deflection of the head 21 and the file section 19 until a predetermined force has been exerted thereon. The section of the file, as illustrated in Fig. 3, is mounted in position to be engaged by the end of the welding rod 17 after the welding device has been returned to its initial position and as the cross bar 8 is swinging forwardly to engage the workpiece to begin the next succeeding welding operation. As the arms 5 and 7 are moving to swing the cross bar 8 into engagement with the workpiece, the end of the welding rod 17 will strike the face of the file section 19 with sufficient force to deflect the file section downwardly into position illustrated in Fig. 1. The file surface removes the crusted flux from the end of the rod as the end and the underside of the rod pass thereacross so that a metal-to-metal engagement will always occur between the rod and the metal of the workpiece at the joint. As the device is advanced along the joint, the support for the rod will move out of engagement with the file section 19 so that the arm 22 may pivot back to its initial position, that illustrated in Fig. 3.

The forward end of the cross bar 8 also supports mechanism for interrupting the welding operation when the finger 11 accidentally moves from the edge of the flange 13. This mechanism embodies a link 30 having a pintle 32 received by a recess in an adjusting screw 33 and a recess 34 which receives a pintle 35. In this manner, the link 30 is pivoted for swinging movement in a horizontal plane. The forward end of the link supports a roller 36 in position to engage the surface of the flange 12 when the finger 11 engages the top edge of the flange 13. When in this position a surface 37 at the rear face of the link 30 deflects a plunger 38 inwardly of a switch 39 without interfering with the circuits which control the movement of the finger 11 into engagement with the joint 14. Should the finger 11, however, fail to engage or thereafter become disengaged from the top of the flange 13, the roller will move outwardly an amount at least equal to the thickness of the material of the flange 13, which movement is sufficient to permit the plunger 38 of the switch 39 to move outwardly, to thereby control a circuit, which retracts the arms 5 and 7 in the same manner as occurs at the end of the welding operation, rendering the device inoperative as it completes its advancement along the joint which was to be welded; otherwise welding would occur at a point remote from the joint which could damage the rail structure beyond repair. The swtich 39 is mounted on a bracket 41 by a screw 42 extending into a slot in the bracket which permits the switch to be adjusted thereon and retained in adjusted position by an adjusting screw 43. The swinging of the links to retracted position is effected by a rod 44 which is actuated by a piston in a cylinder (not shown), as explained in the aforesaid applications. It is to be understood that the cross link 8 also carries a compensating mechanism, not herein illustrated, which adjusts the welding rod 17 relative to the finger 11 so as to have it accurately follow the joint 14 to be welded as the finger follows the undulated path of the joint.

What is claimed is:

1. In a welding device, a welding rod, means for supporting the welding rod for movement into and out of engagement with the workpiece, a section of a filelike element, and means for mounting the section of the element in the path of movement of the welding rod toward the workpiece for removing the crusted flux from the end of the rod before the end engages the workpiece.

2. A device as illustrated in claim 1, wherein mounting means are provided for the filelike section which permit it to be moved out of the path of the rod as the rod passes thereover.

3. In a welding device, a support for a welding rod, means on the support for permitting its movement into engagement with a workpiece, a filelike element disposed in the path of movement of the welding rod, and means for permitting said element to deflect out of said path as the end of the welding rod moves thereacross.

4. In a welding device, a support, a welding rod on said support, a guide finger on said support, said support being movable toward the workpiece to have the finger engage the joint to be welded for guiding the rod therealong, a filelike element in the path of movement of the rod, and means for mounting said element for retractive movement to permit the rod to pass thereover.

References Cited in the file of this patent
UNITED STATES PATENTS

| | | |
|---|---|---|
| 1,636,104 | Murray | July 19, 1927 |
| 1,860,172 | Chapman | May 24, 1932 |
| 1,932,119 | Reed | Oct. 24, 1933 |
| 2,163,657 | Beckman | June 27, 1939 |
| 2,357,038 | Whitesell | Aug. 29, 1944 |
| 2,457,644 | Crossman | Dec. 28, 1948 |
| 2,634,353 | Geiszler | Apr. 7, 1953 |
| 2,646,649 | Rhodes | July 28, 1953 |